Patented Feb. 9, 1937

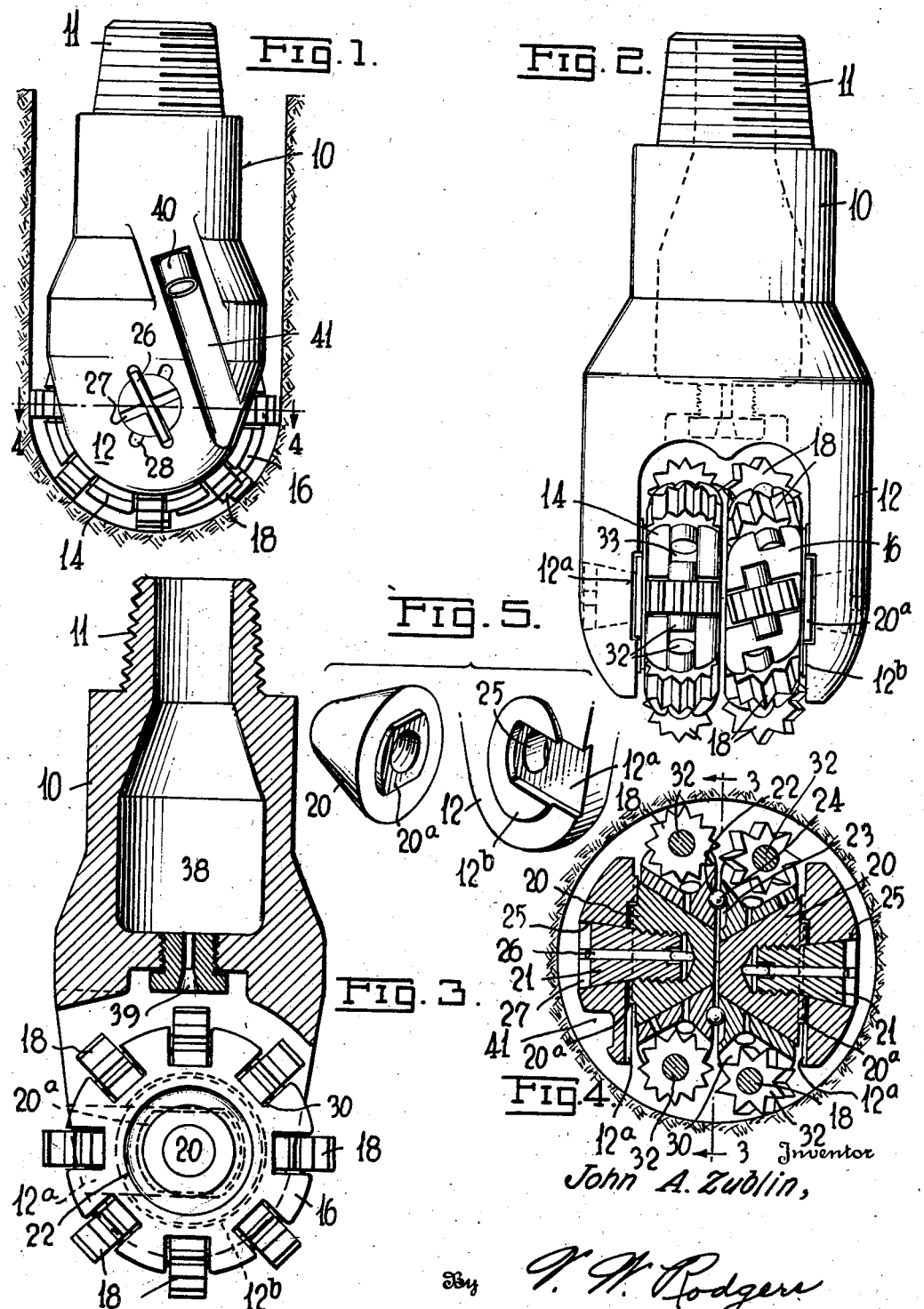
Feb. 9, 1937. J. A. ZUBLIN 2,069,798
DRILLING TOOL
Filed July 22, 1936

2,069,798

UNITED STATES PATENT OFFICE 2,069,798

DRILLING TOOL

John A. Zublin, Los Angeles, Calif.

Application July 22, 1936, Serial No. 91,895

7 Claims. (Cl. 255—71)

The present invention relates generally to tools used in drilling wells, and more especially to such tools having one or more cutter carriers rotatably mounted on a shank. Tools of this type are shown in my copending applications on "Earth boring tool with rolling cutters", Serial No. 56,252, filed Dec. 26, 1935; now Patent No. 2,050,989; "Rotary earth boring tool with rolling cutters", Serial No. 71,600, filed March 30, 1936; now Patent No. 2,050,988; "Core drill", Serial No. 86,688, filed June 22, 1936; "Reaming tool", Serial No. 86,687, filed June 22, 1936; and the present improvements will be described as applied to those tools of the two first applications, though without necessarily limiting the invention thereto. Reference may be made to my copending cases for additional details of construction and operation.

It is a general object of my invention to provide an improved bearing structure of the rotating cutter carriers which will eliminate all bearing surfaces from the shank and so lengthen its life, and will place the bearing surfaces on parts that are easily and cheaply repaired or replaced when worn.

It is also an object to provide a bearing structure that is sufficiently flexible in its make up to permit the carriers to be shifted horizontally so that with parts of a given size, holes of different sizes can be drilled.

Another object of the invention is to provide a bearing for the rotating carriers such that the forces set up by drilling keep the carrier continuously in intimate contact with its bearing and insure close fit throughout the life of the bearing.

It is also an object to provide a bearing of such a character that as it wears the carriers shift to positions in which they increase the gauge of the bit and so tend to keep the hole to full size by compensating for wear on the cutters themselves.

An additional object is to provide a bearing structure that secures the bearings and carriers in place so that they cannot drop off the shank and become lost in the hole even though some of the parts should break.

This is accomplished in a tool constructed according to my invention by providing a bearing member of frusto-conical shape for each of the carriers which, as they rotate on these bearings, bring the cutters on the carriers into intermittent contact with the formation. The bearing has a boss with flattened sides that is received in a slot in the shank to hold the bearing against rotational or vertical movement on the shank. The bearings are so mounted that the pressure of the cutters against the formation forces the carriers toward the larger end of the bearing, thus insuring a continuous intimate fit.

How these and other objects and advantages of my invention are accomplished will be better understood by reference to the following description and the annexed drawing, in which:

Fig. 1 is a side elevation of an assembled drilling bit with two carriers;

Fig. 2 is a front elevation of the bit as viewed from the right of Fig. 1;

Fig. 3 is a vertical median section of the bit as on line 3—3 of Fig. 4;

Fig. 4 is a horizontal section on line 4—4 of Fig. 1 but rotated 90° clockwise; and Fig. 5 is a perspective view of the fragmentary lower end of one shank leg and a cone bearing separated therefrom.

There is shown in Fig. 1 a drill bit provided with a shank, generally indicated at 10, having on its upper end threaded pin 11 by means of which the shank is attached to a drill stem for rotation thereby about a longitudinal axis which is normally vertical or generally so. The lower portion of the shank is formed with two spaced depending legs 12 which carry between them two cutter carriers 14 and 16. About the periphery of each of these carriers is rotatably mounted a plurality of rolling cutters 18.

The means provided for rotatably mounting each carrier upon the shank comprises a conical bearing 20 held in position on one of legs 12 by a tapered pin 21 threaded at one end and screwed into the bearing. Bearing 20 is held against rotation relative to the shank by means of raised boss 20$^a$ on the large end of the bearing, and flattened across two sides as shown in Figs. 3 and 5. Each leg 12 has a horizontally elongate slot 12$^a$ opening to one side of the shank leg and of proper dimension to receive boss 20$^a$ across its flattened, parallel surfaces so that bearing 20 cannot rotate.

Each leg 12 has a raised U-shaped boss 12$^b$ (Fig. 5) against which is seated the end of the cone bearing around boss 20$^a$ when pin 21 is tightly screwed into the bearing. Fig. 5 also shows one of the frusto-conical bearings 20 detached from the assembled bit, and shows clearly the boss 20$^a$ with its flat sides, preferably parallel to each other and placed on opposite sides of the central bore which receives a pin 21. In this way the carriers are mounted to revolve about horizontal axes when the drill bit is in its normal upright position. Although cones 20 may be concentric, they are here horizontally offset so that carriers 14 and 16 revolve about eccentric axes in order that the cutters on one carrier contact the formation on only one side of the bit, the two carriers thus bringing cutters into cutting engagement on opposite sides of the bit as in Fig. 4.

In order to absorb the lateral thrust of the carriers against each other, a suitable thrust bearing is provided between the carriers 14 and 16. This thrust bearing is formed by annular groove 22 in carrier 14 and a corresponding annular groove 23 in carrier 16. Groove 22 is semi-circular in cross-section, while groove 23 is of considerably greater width, so that ball bearings 24 held in the channel formed by the two grooves are allowed radial movement in groove 23 for the distance required by the eccentricity of the two carriers.

When assembling the bit, carrier 14 is laid flat, and groove 22 is filled with ball bearings, then the other carrier 16 is laid over the first one holding balls 24 in place. Next, a bearing cone 20 is placed in each of the carriers and the entire assembly moved side-ways into the space between shank legs 12, the bosses on the bearing cones sliding into shank slots 12a. The two bearings 20 are then fastened in place by inserting a pin 21 through the tapered hole 25 in each shank leg 12 and tightening up the pins until their tapered heads seat firmly in the shank openings, thus drawing bearings 20 tightly against the inner faces 12b of the legs. Each pin 21 thus supports a bearing and carrier on a shank leg. A cotter pin 26 has been previously inserted in each pin 21 with the rounded head of pin 26 placed inwardly, and when the taper pin is properly tightened the split end of the cotter pin is spread outwardly into slots 27 and 28 in the taper pin and shank respectively, as shown in Fig. 1, to lock the taper pin against rotation.

Boss 20a and slot 12a form a safety lock that prevents vertical and especially downward movement of the bearings and their carriers relative to the shank so that even if one or both taper pins 21 break, the carriers cannot become lost in the hole.

It will be seen that the carriers can be made mutually concentric or eccentric to a desired degree by proper relative location of holes 25 in the two shank legs, and in this way the size of hole drilled by a shank and cutter carriers of given sizes can be varied over a certain range.

Each cutter carrier 14 and 16 comprises a generally circular, wheel-like body formed with a conical bearing surface to receive cone 20 located concentric with the central transverse axis of the carrier. An annular groove 22 or 23 is formed in one side face to hold the ball bearings for the thrust bearing between the carriers, and a plurality of slots 30 are spaced about the carrier periphery and extend radially inwardly therefrom. In each of slots 30, which are hereinafter referred to as radial slots for ease of identification, is placed a cutter 18 mounted to revolve about an axle pin 32 and projecting radially beyond the carrier. As may be seen best from Fig. 2, pins 32 are inserted in notches 33 in the carrier periphery at each side of the radial slots and are welded into place to complete the cutter assembly. While cutters 18 may be of any suitable shape and diameter, they are preferably substantially cylindrical rollers with axially extending teeth.

The cutters on carrier 14 revolve about axes perpendicular to the axis of the carrier since axle pins 32 are placed tangentially around the carrier periphery and lie in or parallel to the central plane of revolution of the carrier. On carrier 16 the cutters revolve about axes inclined to said plane of carrier revolution, though axle pins 32 are still tangential to the carrier. It is preferred to have the cutters on one carrier inclined to the cutters on the other carrier so that the various tooth impressions in the formation lie at an angle to one another as this produces more effective cutting.

The upper end of shank 10 is formed with an internal fluid passage 38 which receives circulation fluid from the drill stem. Part of this fluid discharges from nozzle 39 directly onto the cutters as they pass beneath while out of contact with the formation. The remainder of the circulation fluid from passage 38 discharges from nozzle 40 and passes downwardly through channel 41 to the bottom of the hole. Channel 41 is placed close to the well wall which acts as a closure for the open side of the channel to partially confine the fluid therein, as described in my copending application Serial No. 83,079 filed June 2, 1936 on "Fluid passage for drilling tools".

As viewed in Fig. 4, the bit is normally turned to the right or clockwise, during drilling. Consequently, by mounting the cone bearings 20 with their smaller ends inwardly or facing each other, the reaction of the cutters against the sides of the hole forces each carrier toward the larger end of its bearing. As the bearing surfaces of cone and carrier become worn, the carrier moves slightly toward the larger or outside end of the bearing, so that a continuous intimate fit is always assured between these parts. This movement increases the size of hole drilled and so tends to compensate for wear on the cutters themselves. However, the steep angle of the cone keeps the movement within such limits that the carriers do not press against the shank leg, and by this construction the shank itself needs only minor and infrequent repairs since it does not become worn.

Since various changes in construction and design may be made without departing from the spirit of my invention, it is intended that the foregoing description of a present preferred form of my invention be considered as illustrative of rather than restrictive upon the claims appended hereto.

I claim as my invention:

1. In a rotary well drilling tool, the combination of a shank adapted for attachment to a drill stem, and having a slot opening to one side of the shank, a bearing member supported on the shank and having a non-circular boss on one end adapted to be engaged by said shank slot to prevent rotation or vertical movement of the bearing relative to the shank, a cutter carrier rotatably mounted on the bearing, and a plurality of individual cutters rotatably mounted on the carrier for successive intermittent contact with the formation upon rotation of the carrier on said bearing.

2. In a rotary well drilling tool, the combination of a shank adapted for attachment to a drill stem and having a slot opening to one side of the shank, a conical bearing member supported on the shank and having a non-circular boss on one end adapted to be engaged by said shank slot to prevent rotation or vertical movement of the bearing relative to the shank, a cutter carrier rotatably mounted on the bearing, and a plurality of individual cutters rotatably mounted on the carrier for successive intermittent contact with the formation upon rotation of the carrier on said bearing.

3. In a rotary well drilling tool, the combination of a shank having a pair of spaced depending legs; a conical bearing member supported on the inner face of each leg; a cutter carrier rotatably mounted on each of the conical bearings; a thrust bearing between the two carriers; and a plurality of individual cutters rotatably mounted on the carriers for successive intermittent contact with the formation upon rotation of the carriers on said bearings.

4. In a rotary well drilling tool, the combination of a shank having a pair of spaced depending legs, both legs having a slot opening to the same side of the legs; a bearing member supported on the inner face of each leg, and each bearing having a boss adapted to be engaged by a leg slot to hold the bearing against vertical or rotational movement relative to the shank; a cutter carrier rotatably mounted on each of the bearings; a thrust bearing between the two carriers; and a plurality of individual cutters rotatably mounted on the carriers for successive intermittent contact with the formation upon rotation of the carriers on said bearings; all being arranged to permit the bearing members, carriers and thrust bearings when in assembled position to be moved as a unit sideways into the space between the shank legs.

5. In a rotary well drilling tool, the combination of a shank having a pair of spaced depending legs, both legs having a slot opening to the same side of the legs; a conical bearing member supported on the inner face of each leg, and each bearing having a boss adapted to be engaged by a leg slot to hold the conical bearing against vertical or rotational movement relative to the shank; a cutter carrier rotatably mounted on each of the bearings; a thrust bearing between the two carriers; and a plurality of individual cutters rotatably mounted on the carriers for successive intermittent contact with the formation upon rotation of the carriers on said bearings; all being arranged to permit the conical bearing members, carriers and thrust bearings when in assembled position to be moved as a unit sideways into the space between the shank legs.

6. In a rotary well drilling tool, the combination of a shank having a pair of spaced depending legs; a pair of conical bearing members, a pair of securing pins, one such pin passing through each leg and securing a bearing to the inner face of the leg; means to hold the bearing against rotation; a cutter carrier rotatably mounted on each of the conical bearings; a thrust bearing between the two carriers; and a plurality of individual cutters rotatably mounted on the carriers for successive intermittent contact with the formation upon rotation of the carriers on said bearings.

7. A bearing for a rotatable cutter carrier comprising a frusto-conical body having a central threaded bore at the large end, and a boss surrounding said bore and having two parallel sides located on opposite sides of the central bore.

JOHN A. ZUBLIN.